1483X C. Alger,
Casting Iron Rolls.
Patented Mar. 30, 1811.
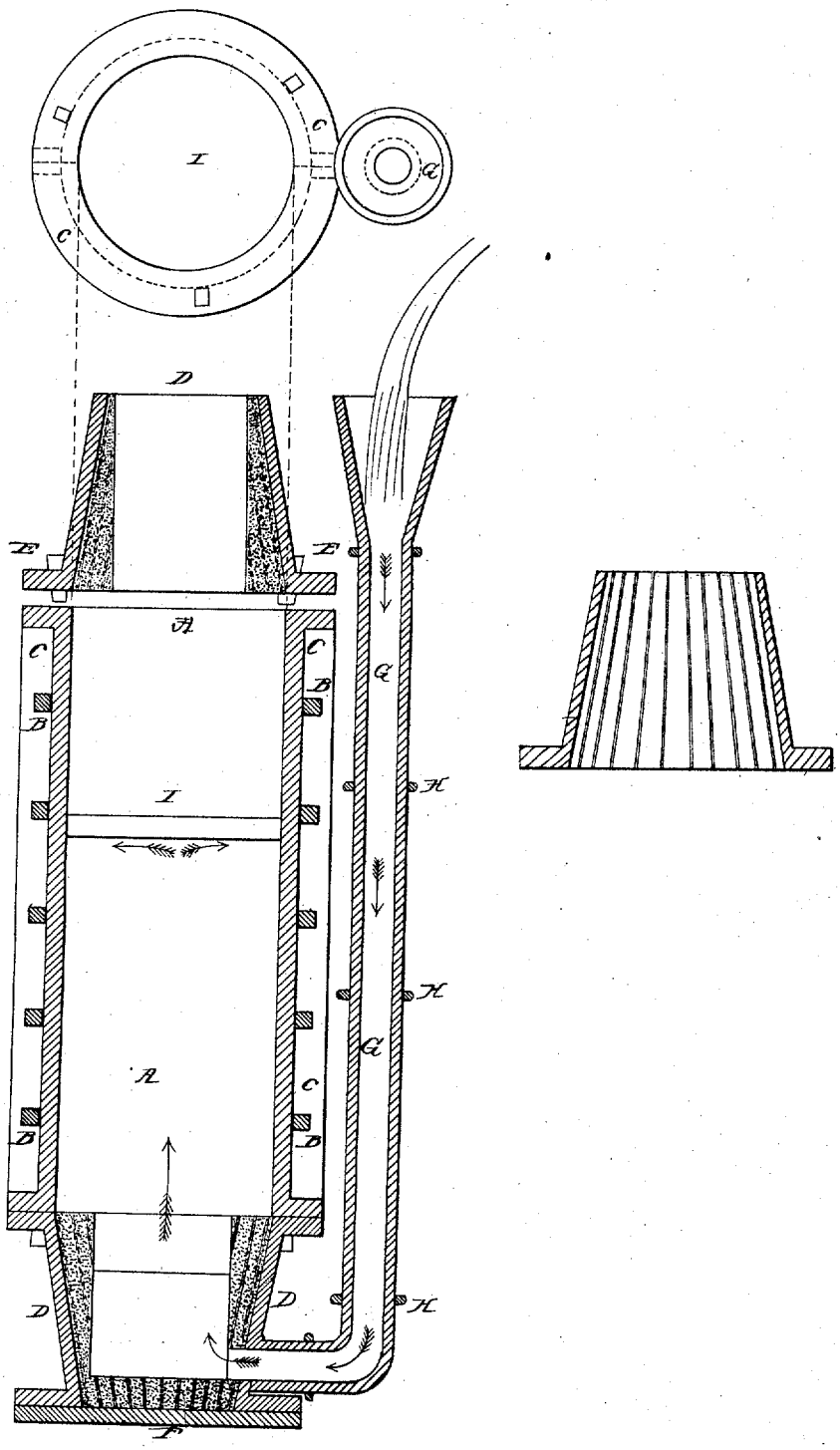

Mar. 30. 1811 1483X 35

Cyrus Alger

Letters Patent

The schedule referred to in these Letters Patent and making part
of the same containing a description in the words of the said Cyrus
Alger himself of his mode of casting large iron Rollers for
Rolling iron &c.

The invention of this improvement in casting
large iron rollers for rolling iron and other metals into sheets plates
and bars, consists in the first place in constructing the moulds
in such a manner as to have the roller surface cast in iron moulds
and the shoulders and gudgeons of the roller cast in sand; and in the second
place in the method to be observed in pouring the melted iron into the
moulds in order to have the rollers cast perfectly sound strong and free
from "cold shuts" in the surface of the body of the roller.

And first. The part of the moulds in which the body of the Roller
is cast is called the cylinder and is made of cast iron three or four
inches thick and as long and large in diameter as is required in the Roller
to be cast in it. This cylindrical part of the moulds is made in two
pieces or halves each ~~half~~ being half a circle, and are made to fit
together with a good joint and fastened together with strong key bolts
which go through ledges cast on the circular sides close to the joint
of each piece. When thus fastened together by said key bolts which
must be well fitted, the inside of it must be turned perfectly smooth
and true and polished in a lathe, and the ends are also turned true
and smooth the inside diameter must be the same at both ends. When
the Roller is cast and cool, the said cylinder is unkeyed and taken apart
otherwise it would be very difficult to get the roller out of the moulds.
This part of the moulds must be made very perfect in the inside in
order that the Rollers surface when cast therein may be equally perfect.
To each end of this cylinder are also fixed with key bolts two other
conical cylinders of cast iron which contain the sand in which the
sand in which the gudgeons and shoulders of the roller are moulded
and cast. These conical cylinders called the top and bottom necks of the moulds are cast with a wide rim or flange at their largest ends which
rim is to be turned in a lathe to make it fit with a good joint to the e
of the said cylinder, each of the said neck part of the moulds is faste
to the end of the said cylinder by three key bolts well fitted so as to se
as steady; proper ears or handles must be fastened on each side o
said Cylinder and said top and bottom necks so as to handle them
with ease and safety. The bore of these neck pieces of the moulds
about a quarter smaller at their smallest ends than the bore of the c
inside and are also much thinner than the said cylinder to whose ends
are fastened. The inside of these neck pieces may have several small
cast in so as to prevent the sand from falling out. To the smallest en
of the bottom neck piece a rim is cast on so as to fix on it a bottom pie
of cast iron by key bolts. This said bottom piece serves as the base on
the whole mould is supported in a perpendicular direction when castin
The cast iron part of the moulds being thus made the pattern for the
is then put into the moulds, which are then keyed together, and th
body of said patterns must fit the inside of the cylinder part of the
the sand such as is used in casting iron is then filled into the ne
of the moulds and pounded in sufficiently firm round the gudgeons
said pattern and against the shoulders of the body of it. The said b
tom piece which serves as the base of the moulds is then keyed on firm
The top neck of the moulds being five or six inches longer than the gu
eon of the roller to be cast therein, has a hole made in the sand therei
of the size of the gudgeon and in the same direction to the top of it, a
hole being filled with melted iron when the roller is cast supplies t
condensation of the gudgeon and roller below as they gradually cool
and thereby renders the adjacent gudgeons sound and strong, when the roller
cool the top end or the upper gudgeon which is called the "Sprue" i
cut off, the moulds are then made and keyed together, so that when the
is cast and cooled it may be taken out by unkeying the moulds, the
cylinder part of which being the part of the iron mould in which the bo
of the roller is cast is taken off with ease from the body of the roller.
shoulder and gudgeons being cast in sand are also easily taken out of th mou Before the melted iron is poured in the moulds must be made very warm especially the body part of it so that the melted iron may not chill as it is called when it meets the iron surface of the said body of the mould.

To the lower neck piece of the moulds is fixed a tube the whole of which communicates with the lower end of the cavity of the thing moulded and the other part of this tube extends in perpendicular height equal to the height of the moulds. The melted iron is poured into this tube and enters at the bottom of the mould instead of being poured in at the top of the moulds as is customary. This tube is made in two pieces and put together with rings or other fastenings somewhat like a [illegible] mould The inside of this tube is coated over with clay so that after the roller is cast the cast iron in this tube may be easily taken out by taking said tube apart longitudinally. The top of this tube is made like a funnel so as to be convenient in pouring the melted iron into it. Care must be taken to have the longitudinal joints of the said cylinder and the joints of the two neck pieces on the ends of said cylinder made tight so that the melted iron may not leak out, and also to have the inside of said cylinder wiped clean and made sizzing hot so that the surface of the body of the roller may be cast perfectly smooth and free from imperfections. Secondly the the method to be observed in casting said Rollers in these moulds is this viz. to have a circle or rim cut out of a pine board, or other suitable wood so as to fit the inside of the body of said moulds. This wooden circle is put into the said cylinder or body of the moulds and the top neck of the moulds is left off until the melted iron when poured in has filled the body of the said mould and raised the said wooden circle to the top when it is taken off and the said top neck of the moulds is put on, keyed down, and then the melted iron is again poured in until the mould is filled; the use of this wooden circle is to keep the impurities on top of the melted iron from the sides of the body of the moulds and thereby prevent them from being cast in the surface of the roller and this wooden circle effects this important object and keeps all the impurities on the middle of the melted iron and when the mould is full they may then be taken off or remain [illegible]

the top of the [illegible] where they can do no injury. The qualities required
in cast iron Rollers for Rolling mills to roll down iron and other metals [illegible]
sheets plates and bars, are to have them cast true so as to occasion [illegible]
the labor to turn them to have the surface of the body of the roller h[illegible]
and to have the gudgeons as well as the body of the Roller cast solid
strong internally as well as externally, and the surface of the roller [illegible]
be smooth true and free from cold shuts. Rollers cast in moulds of the
situation and with this method well observed have been found to [illegible]
[illegible] these important qualities and which render them superior to those [illegible]
in any other manner. Care must also be taken to put the moulds together
in one way so as to prevent any mistake. In moulds thus constructed
may be cast those [illegible] rollers for rolling iron into round and square bars
As in this case it would only be necessary to have the said cylinder in [illegible]
the body of the roller is cast turned out with proper circular and [illegible]
ing grooves as may be wanted in the Rollers. The Rollers are cast in th[illegible]
perpendicular position with the gudgeon having a square on its end by
which to put it in operation downward, or at the bottom when cast. [illegible]
if the moulds are well made and the pattern of the Roller well moulded
the Rollers will be cast so true as to admit of them being ground in a con[illegible]
cave or half round piece of cast iron with coarse sand and water and fin[illegible]
ed with coarse emery without the trouble of turning said Rollers with
edge tools which require much time in consequence of the surface
of the said Rollers. And to grind the Rollers true in this way it is
necessary to have them run very rapidly in the Lathe.

[illegible] Witnesses
[illegible] John Fairbanks
[illegible] Knight.

Cyrus Alger

[illegible]